United States Patent [19]
Piirainen

[11] Patent Number: 6,084,868
[45] Date of Patent: Jul. 4, 2000

[54] BASE STATION HAVING TRANSMITTER POWER ADJUSTMENT SYSTEM

[75] Inventor: Olli Piirainen, Oulu, Finland

[73] Assignee: Nokia Telecommunications Oy, Espoo, Finland

[21] Appl. No.: 08/849,886

[22] PCT Filed: Dec. 19, 1995

[86] PCT No.: PCT/FI95/00688

§ 371 Date: Jun. 17, 1997

§ 102(e) Date: Jun. 17, 1997

[87] PCT Pub. No.: WO96/19878

PCT Pub. Date: Jun. 27, 1996

[30] Foreign Application Priority Data

Dec. 20, 1994 [FI] Finland ................................. 945978

[51] Int. Cl.[7] .................................................... H04J 3/00
[52] U.S. Cl. ......................... 370/345; 455/561; 370/350
[58] Field of Search .................................. 370/311, 314, 370/321, 324, 329, 337, 345, 350, 252, 391, 280, 318, 317; 455/403, 463, 13.4, 298, 561, 562

[56] References Cited

U.S. PATENT DOCUMENTS

| 5,237,592 | 8/1993 | Nonami . |
| 5,384,828 | 1/1995 | Brown et al. ........................... 455/463 |
| 5,528,593 | 6/1996 | English et al. .......................... 370/391 |

FOREIGN PATENT DOCUMENTS

| 511 614 | 11/1992 | European Pat. Off. . |
| 612 162 | 8/1994 | European Pat. Off. . |
| 614 269 | 9/1994 | European Pat. Off. . |
| 621 685 | 10/1994 | European Pat. Off. . |
| 94/10812 | of 0000 | WIPO . |
| 92/16058 | 9/1992 | WIPO . |

OTHER PUBLICATIONS

GSM System for Mobile Communications; Michel Mouly, Marie Bernadette Pautet, 1992.
Recommendation GSM 05.04, Jan. 1991, pp. 1–3.
Recommendation GSM 05.05, Mar. 1991, pp. 1–19.
Recommendation GSM 05.10, Jan. 1991, pp. 1–6.

*Primary Examiner*—Chau Nguyen
*Assistant Examiner*—Chiho Andrew Lee
*Attorney, Agent, or Firm*—Pillsbury Madison & Sutro

[57] ABSTRACT

A base station for a mobile communication system which has switching centers and base stations connected by telecommunication links, each base station transmitting radio signals divided into a plurality of time-slots in a frame structure, a controller unit for controlling the base station; a transmitter for generating a transmission signal, the transmitter being connected to the switch to supply the transmission signal to the antenna via the switch; a counter for counting the length of time-slots in a frame structure synchronized by a frame alignment signal, a programmable memory in which one or more delay values are each stored as a counter value, a selecting unit for selecting a delay value desired by the user, and a power level memory responsive to the counter and storing power level memory momentary power values corresponding to the parts of the time-slots in the frame structure, as well as information on whether the switch supplying the transmission signal of the transmitter to the antenna is switched off or on, or neither, the power level memory being arranged so that each part of the time-slot in a frame structure is represented by a specific memory address of the power level memory, and in the memory location corresponding to the memory address, in addition to momentary power values of the curve indicating the power level, information is stored on whether the switch supplying the transmission signal of the transmitter to the antenna is switched off or on, or neither.

2 Claims, 4 Drawing Sheets

BASE STATION HAVING TRANSMITTER POWER ADJUSTMENT SYSTEM

This application is the national phase of international application PCT/FI95/00688, filed Dec. 19, 1995 which designated the U.S.

FIELD OF THE INVENTION

The invention relates to a base station for a mobile communication system comprising one or more switching centres and base stations connected to it by telecommunication links, each base station comprising an antenna for transmitting radio signals divided into time-slots by means of a frame structure, a controller unit for controlling the base stations, means for generating a frame alignment signal, a transmitter for generating a radio signal, the transmitter further comprising digital means for producing a digital signal to be modulated.

BACKGROUND OF THE INVENTION

Frame Structure and Modulation

The air interface of GSM mobile communication systems (GSM=Global System for Mobile Communications) is based on the TDMA technique (TDMA=Time Division Multiple Access), according to which a number of simultaneous calls may be transmitted on a same radio frequency. Calls transmitted on the same radio frequency are separated from each other in the time domain, i.e. the time on the radio path is divided into slices, i.e. time-slots, and each time-slot may be used for transmitting a separate call. This time-division forms a frame structure, which determines how many calls may be transmitted on one radio channel in the GSM system, it is possible to transmit up to eight calls in one frame structure on a full-rate speech channel. The frame structure of the GSM system is disclosed in M. Mouly & M. -B. Pautet, The GSM System for Mobile Communications, 1992, Mouly & Pautet, Palaiseau, France (in the following referred to as M & P), especially FIG. 4.15.

The properties of a transmitter of a GSM base station are described in two GSM specifications: GSM 05.04, January 1991, Recommendation GSM 05.04: Modulation, ETSI/PT 12 (3 pages in total), and GSM 05.05, March 1991, GSM Recommendation 05.05: Radio Transmission and Reception, ETSI/PT 12 (19 pages in total). Briefly, the above-mentioned recommendations make the following three demands for a transmitter: the broadest allowable frequency band (GSM 05.05 ANNEX 1), the maximum allowable phase error in modulated data (GSM 05.05, section 4.6), and power adjustment control for modulated data during a time-slot (GSM 05.05 ANNEX 2).

GSM recommendations define a TDMA frame to be used in GSM mobile communication systems, the time of which frame is divided into eight different time-slots. The maximum number of calls on one radio channel is thus eight when full-rate coding is employed. Naturally, it is also possible to use other rates, such as half-rate coding. The length of each time-slot is 156.25 bits, or they may alternatively be arranged so that the first and the fourth time-slot are longer, i.e. 157 bits in length, the other ones being 156 bits in length. In such a case, the lengths of the time-slots are in succession as follows: 157, 156, 156, 156, 157, 156, 156, 156 bits. This succession is disclosed in GSM recommendation GSM 05.10, January 1991: Radio Sub-system Synchronization, ETSI/PT 12 (6 pages in total), section 5.7. In that case, the length of each bit is 3.69 μs.

Each time-slot contains 148 bits of data to be transmitted, and a guard-time of 8.25 bits. The binary data, i.e. the 148 bits transmitted during each time-slot contain a training sequence of 26 bits. This sequence of bits is known both by the transmitter and by the receiver, and its location is always the same. By means of a training sequence, it is possible to determine the location of the start and the end of a time-slot when the location of a training sequence of the transmission is detected within a time-slot. The training sequence is also described in M & P, in particular in chapter 4.3.1.1 and table 4.3. The training sequence may thus be used for synchronizing the transmitter and the receiver.

The guard-time, i.e. the 8.25 bits remaining from said 148 bits is intended for power adjustment carried out between different time-slots (M & P: FIG. 4.23). Half of the bits are located at the beginning of the time-slot, and another half at the end of the time-slot. Power adjustment is carried out so that at the end of data sent in the preceding time-slot and coming from a GMSK modulator, the Dower is dropped along a falling cosine curve close to zero, and, at the beginning of a new time-slot, the power is increased along a rising cosine curve to a desired power level before sending the actual 148 bits, i.e. a normal burst.

The guard times at the beginning and at the end of the time-slots may be used for power adjustment, and data is neither transmitted nor received during them. The guard times are located between two time-slots. The location of the beginning and the end of a time-slot, and that of the guard times are determined by means of the above-mentioned training sequence in the data to be transmitted.

The binary data to be transmitted is modulated by means of a GMSK modulator in accordance with the GSM recommendation 05.04, see also M & P: section 4.3.4. The GMSK modulator used is a Gaussian Minimum Shift Keying modulator Power Adjustment A number of simultaneous calls may be transmitted on the same radio channel so that they are transmitted within the same TDMA frame. The physical position of each mobile station with respect to the base station may vary from one mobile station to another. Within a TDMA frame, a different call may be transmitted during each time-slot, and consequently, it must be possible to transmit each time-slot by using a different power level, as the mobile stations participating in a call are probably at a different distance from the base station. Power adjustment from one level to another takes place gradually for reducing interference, see M & P: FIG. 4.23. GSM Specification 05.05 ANNEX 2, for instance, determines limits for power adjustment. GSM Specification 05.05 (sections 4.1.1. and 4.1.2) determines 16 different power levels, from which the most appropriate one for each call to be transmitted will be chosen at each moment.

Figure 1:
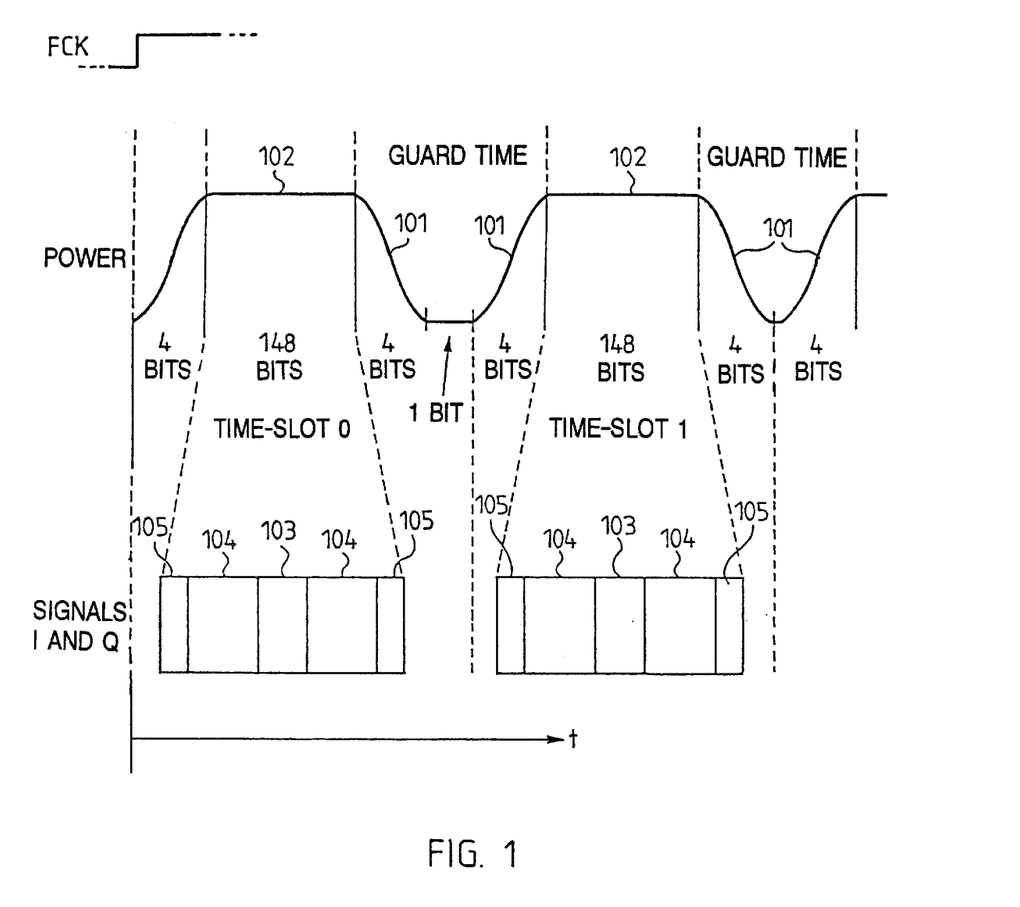
FIG. 1 shows mutual timing of modulated data and power control in a prior art base station, FIG. 1 has already been described in the description of the prior art.

FIG. 1 shows the mutual timing of signals I and Q of modulated data and the power adjustment signal POWER. FIG. 1 shows the form of an ideal power adjustment signal POWER, and the composition of the data to be transmitted from the digital parts of the base station transmitter to a modulator in signals I and Q, as well as the timing of the signals with respect to each other during the first two time-slots TIME-SLOT 1 and TIME-SLOT 2. In the Figure, timing allowed by GSM Recommendation 05.10 section 5.7 for time-slots has been used. FIG. 1 shows guard times 101 for the power adjustment signal POWER, during which times information to be transmitted is not intended to be sent. The length of the guard times is 4+1+4 bits in the first and the fourth time-slot, and 4+4 bits in other time-slots. Accordingly, the power adjustment signal POWER contains a sequence 102 of constant peak power, during which sequence the in-formation is intended to be sent. The length of the peak power sequence is 148 bits. In the middle of the sequence, there is a training sequence 103, and the data to be sent around it will be sent in separate sequences 104 separated by dummy sequences.

It is essential that the data to be sent is transmitted at such a moment of time during which the power level of the transmitter is constant, i.e. during which the value of signal POWER is constant.

In an antenna of the receiver, the signal receives the following form:

TXant=POWER*cos ($w_c$t+F(t)), in which $w_c$=2×p×carrier wave frequency.

F(t)=phase function containing the modulated data from branches I and Q, the bits of the training sequence included. Thus, for instance, I=sin F(t) and Q=cos F(t), whereby the both signals contain the same data. This function is defined in GSM Recommendation 05.04.

Structure and Operation of a Transmitter

Figure 2:
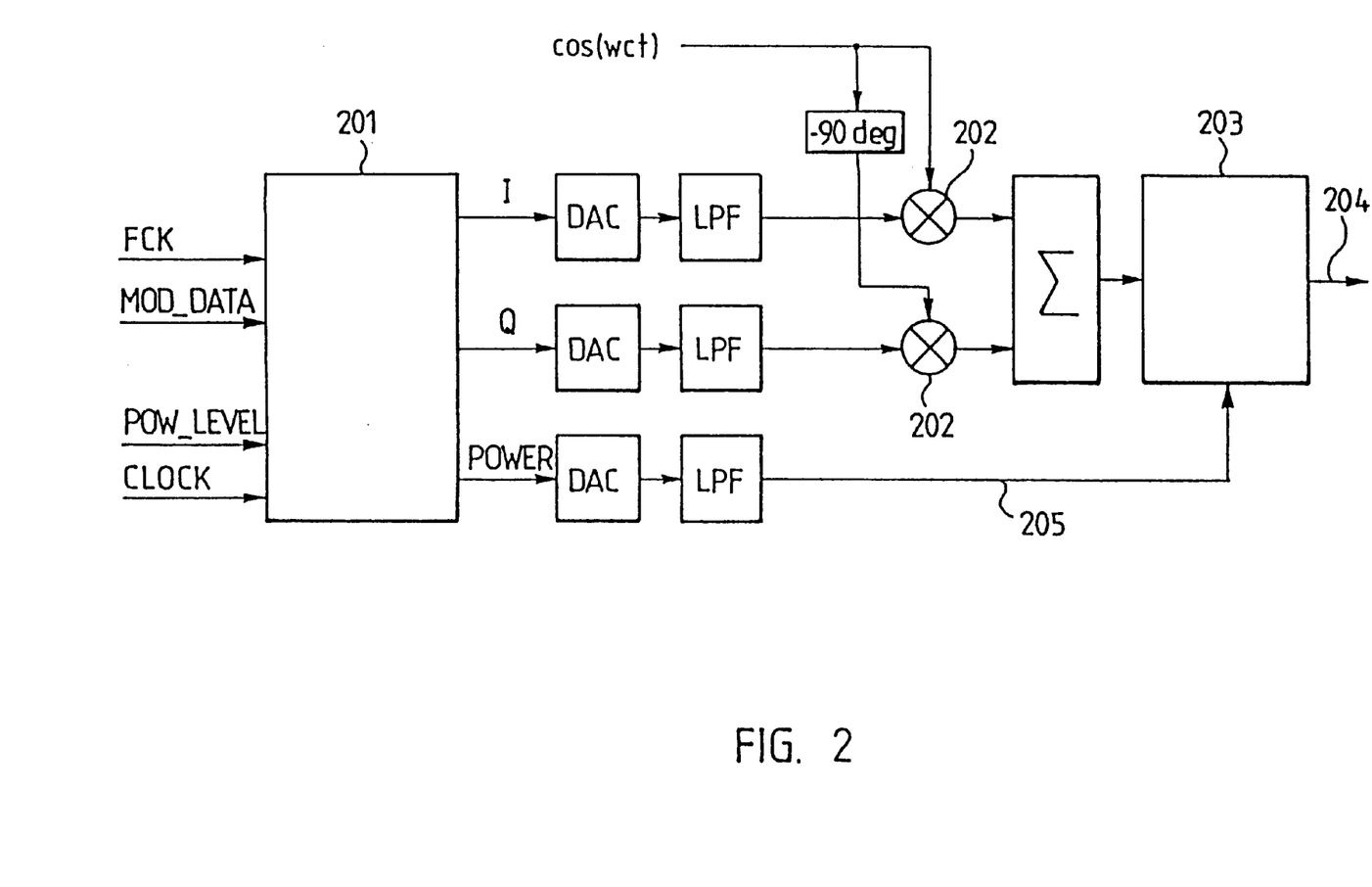
FIG. 2 is a block diagram illustrating a base station transmitter in accordance with the prior art, FIG. 2 has already been described at the beginning of the description.

FIG. 2 shows the principal features of a transmitter. Digital parts 201 comprise the baseband elements of a GMSK modulator, in which elements the binary data to be transmitted is modulated to signals I and Q. The output signals I and Q of the digital parts 201 contain GMSK modulated digital data. Signals I and Q are converted by means of D/A converters DAC into an analog form, and low-pass filtered in low-pass filters LPF. Thereafter, the modulated data is mixed in mixers 202 into a carrier wave cos(wct), which is in the form cos(wct), where wc/2p= fc~900 MHZ. Thereafter, signals I and Q are summed together in summing means Σ, before amplifying the signal in an amplifier 203, and directing it to an antenna 204.

The output signal POWER of the digital parts 201 contains a control signal 205 for amplification of an adjustable amplifier 204 of the transmitter. This signal is used to control setting of different power levels required by different time-slots, and adjustment of power levels carried out during guard times.

The following signals are provided as an input for the digital parts: FCK, i.e. the frame alignment signal, the data to be modulated, i.e. MOD_DATA, power level adjustment signal POWER_LEVEL, and clock signal CLOCK.

Modulation of signals I and Q should be continuous regardless of the phase, or there should be a possibility to attenuate the discontinuities in order that they would not spread the frequency spectrum of the transmitter, or increase the phase error compared with an ideal modulator, which is disclosed in GSM Recommendation 05.04. GSM Recommendation 05.05 sets limits to the maximum allowable signal spectrum and the phase errors.

The solutions in accordance with the prior art are attended by the drawback that in the analog parts of the transmitter, i.e. in the low-pass filters LPF, mixers 202, summing means Σ, and amplifier 203, delays of different lengths, as well as other non-optimal phenomena which are not known before the final measurements have been carried out occur on various signal paths I and Q. This complicates determining accurate timing required by the digital parts 201, and also limits designing the analog parts.

It appears from FIG. 1 that the location of the training sequence 103 within the time-slot to be transmitted is measured by means of the antenna 204 (FIG. 2) of the transmitter. As appears from FIG. 2, signals outputted from the digital parts pass through a number of analog parts after the A/D converters. These analog parts are a low-pass filter, a mixer, a summing means, and an amplifier. These analog parts cause delays, which are difficult to predict.

The analog parts of the I and Q branches are basically identical, and thus a delay of an equal length is expected in both branches. The delay of the signal POWER, in turn, will probably be unequal to the delay of signals I and Q, since the branch of the signal POWER does not comprise as many analog parts as those of the signals I and Q. The branch of signal POWER namely does not comprise mixers 202, a summing means Σ and an amplifier 203. The difference between these two delays shifts the timing of signal POWER compared with signals I and Q. This appears from the timing diagram shown in FIG. 1 so that signals I and Q do not occur quite in the middle of the 148-bit transmission range of high transmission power. Thus, as the timing of a time-slot is calculated on the basis of the location of the training sequence by means of the antenna of the transmitter, the same difference in delays shifts the signal POWER aside by the corresponding time from the optimal timing from the point of view of the digital parts. This, again, is not desirable as GSM Specification 05.05 sets limits to how amplification must function. The above mentioned matter is a real problem for base stations in accordance with the prior art.

Figure 3:
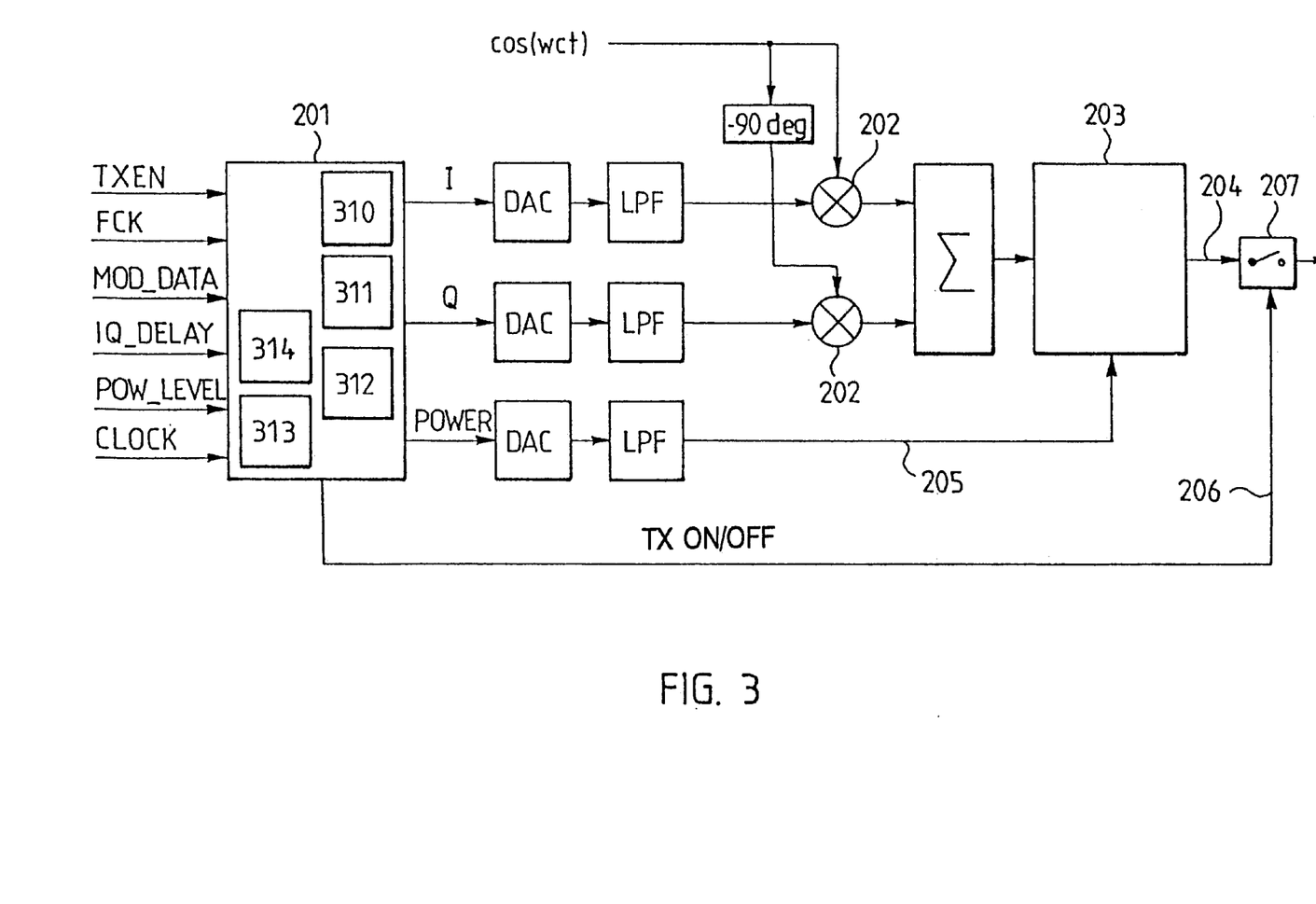
FIG. 3 shows a block diagram of a base station of the invention.

The prior art solutions are thus attended by the following drawback: signals I and Q to be modulated in the time-slot, i.e. transmission of information must occur during such a sequence of the power curve during which a transmitter is transmitting by using a constant power. Transmission of information is not desired to take place at the moments when the power levels are being adjusted and signal POWER is directing the amplification to a new amplification power. Moreover, in solutions in accordance with the prior art, adjustment of timing is complicated as the analog parts of the transmitter cause varying delays of different lengths in the power adjustment control signal (signal POWER) and in I and Q branches of the modulator, which delays are difficult to compensate. ;

Another problem with the solutions in accordance with the prior art is caused by the fact that when no data is sent in a certain time-slot, transmission is to be switched out of operation for the duration of the entire time-slot by switching off the switch 207 shown in FIG. 3. Thus, no signal to be transmitted thus practically passes onto the radio path. In such a case, however, it must be ensured that no interference due to discontinuity of the signal will be caused in the antenna of the transmitter. The switch must be switched on and off exactly at the moment when the power levels are in their minimum values. Due to the non-optimal nature of the analog parts of the base station transmitter, particularly of I and Q branches, it is difficult to control said switch 207 so that the switch is turned off and on exactly when the curve indicating the power level is in its lowest value.

DESCRIPTION OF THE INVENTION

The object of this invention is to control the GMSK modulator of the transmitter of a digital GSM base station and the power adjustment of the transmitter so that the entire data/information sent by the modulator is sent to the amplifier when the curve indicating the amplification of the amplifier is at its peak value.

The aim is thus to implement the digital parts of a GMSK modulator and the digital parts of a power control of a GSM base station transmitter of a mobile communication system, so that the performance of the transmitter achieved by means of them may be optimized depending on the characteristics of the analog parts.

The object of the invention is further to enable power control of a GSM base station so that the amplification of the I and Q branches to be amplified is commanded to start at a desired moment.

Another object of the invention is to provide a GSM base station in which the switch of a conductor supplying power to an antenna is switched off and on exactly at the moment at which the amplification of the signal to be transmitted is in its minimum value, in other words, when its power (POWER) is at its lowest. Delays caused by non-optimal nature of the components may naturally be compensated by commanding the switch into the on-position slightly before the moment of time at which the curve indicating the power level is in its minimum value. Accordingly, at the beginning of a transmission, the switch is to be switched on at the corresponding moment. Solving this problem is complicated by delays in power control, or the signal POWER in the analog parts of the base station. Due to these delays, it is difficult to control the switch in order to switch it off and on exactly at the right moment.

The object of one embodiment of the invention is thus to make it possible to adjust timing of the ON/OFF setting of the transmitter, i.e. to make it possible to switch the transmitter on and off by means of adjustable timing.

This new type of a base station is achieved with a method of the invention, which is characterized in that the digital means of said transmitter, intended for generating a modulated digital signal, further comprise: a counter means for counting the length of time-slots in a frame structure synchronized by said frame alignment signal, a programmable memory means, in which one or more delay values are stored in form of a counter value, means for selecting from said one or more delay values a delay value desired by the user, comparison means for comparing the value of said counter means with the selected delay value contained by the programmable memory means, and for starting transmission of information signals to be transmitted in said time-slot from the digital means, provided that the comparison provides the result that the selected delay value contained by said programmable memory means is the same as the value indicated by said counter means.

The invention is based on the idea that for producing a digital signal, such means are arranged at the digital means of the base station which enable adjusting the timing of signals I and Q with respect to timing of signal POWER adjusting the amplification. This is carried out in accordance with the invention so that a counter means is added to said means for producing a digital signal, said counter means counting the length of time-slots in a frame structure synchronized by the frame alignment signal, as well as a programmable memory means, in which one or more delay values may be stored by the user in form of a counter value. In accordance with the invention, the digital means further comprise means for selecting the delay value desired by the user from said one or more delay values. The embodiment in accordance with the invention further comprises comparison means for comparing the value of said counter means with the selected delay value contained by the programmable memory means, and for starting transmission of information signals, i.e. signals I and Q to be transmitted in said time-slot from the digital means, provided that the comparison provides the result that the selected delay value contained by said programmable memory means is the same as the value indicated by said counter means.

The idea of another embodiment of the invention is to maintain information on whether the switch leading the transmission signal of the transmitter to the antenna is switched off or on, or neither, and naturally the timing of the switch off/switch on -procedure. As it is difficult to predict which is the right moment to switch the transmitter on or off because of unknown delays of the analog parts, said timing information may be added to the power level memory. Separate bits are reserved for each switch, the one in the on position (information TX on) and the one in the off-position (information TX off). Thus, in addition to the signal POWER, the information TX on/off is also included in the software.

An advantage of a base station of this kind in accordance with the invention is the fact that adjusting the timing between the GMSK modulator and the curve indicating the power level, or the signal POWER, enables the data to be modulated i.e. signals I and Q to occur exactly at such a moment in a time-slot at which the power level is constant and in its maximum value. It is thus possible to reduce the phase error of the transmitter. If the timing of modulated data cannot be adjusted with respect to the curve indicating the power level, the shape of the curves must be altered, which will weaken the spectrum.

By means of this invention, digitally variable timing of control of the transmitter is achieved by means of a simple design. The novelty of the invention compared with the prior art solutions lies in the possibility to adjust the location of modulated data separately within the power adjustment curve.

The invention has an advantage that when synchronization of signals I and Q is carried out in accordance with frames instead of time-slots, the modulation will be continuous. In such a case, the spectrum of the transmitter will be better i.e. narrower and the phase error will be smaller.

Another advantage of the invention is that when acting in accordance with the invention, timing of the transmission of a base station may easily be adjusted, even in case of a finished product. In such a case, it is possible to use analog components having different characteristics in assembling the transmitter, and still achieve constant performance in amplification of signals I and Q.

BRIEF DESCRIPTION OF THE DRAWINGS

In the following, the invention will be described in greater detail with reference to the attached drawings, in which.

DETAILED DESCRIPTION OF THE INVENTION

The operation of the digital parts of the base station transmitter and of the entire transmitter must be in synchronism with the timing of the general frame structure of the base station. A rising edge of a frame alignment signal intended for this purpose, i.e. that of a FCK signal indicates the location of the start of a TDMA frame. In this invention, timing allowed by GSM Specification 05.10, section 5.7 is employed, according to which timing the length of time-slots 0 and 4 is 157 bits, and that of the other ones is 156 bits.

The aim is that the logic described in relation to the invention generates signals I and Q and the timing required by them. It is thus possible to avoid problems related to solutions of the prior art.

FIG. 3 shows a block diagram of a base station of the invention. The digital means of a base station transmitter of the invention, being intended for producing a modulated digital signal, comprise the following elements:

Firstly, a counter means 310 is required for counting the length of the time-slots in the frame structure, synchronized by said frame alignment signal. The purpose of the counter counting the length of the time-slot is to count a time-slot 156 bits in length (4+148+4=156 bits=length of the time-slot).

The digital parts of the base station transmitter of the invention further comprise a programmable memory means 311, in which one or more delay values are stored in form of a counter value.

The digital parts of the base station transmitter of the invention further comprise means 312 for selecting one delay value desired by the user from said one or more delay values. Some register means, for instance, may function as these means 312.

A base station in accordance with another embodiment of the invention functions so that it contains the information on whether the switch supplying the transmission signal of the transmitter to the antenna is switched off or on, or neither. That information i.e. control of the bit TX is carried out in accordance with the input signal TXEN and the bits read from the power level memory, e.g. from the odd addresses of the memory, such as 5 and 6. When this information i.e. bit TXEN='1', it indicates that transmission is intended to be turned on in the following time-slot, and, accordingly, when TXEN='0', the transmission is to be turned off. It is advantageous to switch the transmission on/off when the power of the transmitter is in its minimum. An information TX on/off may be programmed into the power level memory separately for each power level: information "TX on" into bit 6, and information "TX off" into bit 5. When TXEN='1' and bit 6='1' is read from an odd address of the memory, TX will be updated to value '1' at a desired moment. Accordingly, when TXEN is '0' and bit 5='1' is read from an odd address of the memory, TX will be updated to value '0' at a desired moment. Value '1' is thus programmed into said memory locations (5 and 6) only for the moment during which the updating of signal TX is desired to take place.

Digital means 201 of the base station transmitter 504 in accordance with the second embodiment of the invention, said means being intended for producing a modulated digital signal, further comprise a power level memory 314 responsive to said counter means 310, in which memory momentary power values corresponding to the parts of the time-slots in the frame structure are stored, as well as the information on whether the switch 207 supplying the transmission signal of the transmitter to the antenna is switched off or on, or neither.

Said power level memory 314 is arranged so that a specific memory address of the power level memory 314 corresponds each part of the time-slot in a frame structure, and in the memory location corresponding to said memory address, in addition to momentary power values of the curve indicating the power level, an information on whether the switch 207 supplying the transmission signal of the transmitter to the antenna is switched off or on, or neither, is stored in form of two bit locations, one bit location adjusting the moment at which said switch 207 is switched off, and the other one adjusting the moment at which said switch 207 is switched on.

The operation of this second embodiment of the invention is as follows:

The counter means counts time-slots to a frame clock (synchronized). The value of this counter is used as the address of a memory means (power control memory). Each address within a time-slot is thus represented by one moment of time.

Two bits, TX_ON and TX_OFF, are reserved from each address of the memory means for recording the information.

When the transmission is turned off (stored TXEN='0'), and it should be turned on in the following time-slot (TXEN='1'), the memory location TX_ON of the memory means is read while the counter is counting. When TX_ON is '1', means for controlling the switch TX_ON/OFF 207 are set into position TX_ON at that moment.

The value zero is first written to all addresses of the memory locations TX_ON and TX_OFF of the memory means, and the value one is written to the bit (TX_ON or TX_OFF) of the memory address corresponding to the desired moment of operation of each function. As this memory may be programmed, the location of bits in the memory may be changed, and the timing of control of the TX_ON/OFF switch may thus also be changed.

This memory is practically the same as the memory used for recording power adjustment curves, whereby no additional memory is required. Only two extra bits must be reserved for controlling the TX. Moreover, as there is a separate power adjustment curve for each power level, separate TX_ON/OFF timing may also be arranged for each power level. In addition, the moment TX_ON may be separate from the moment TX_OFF.

In addition, the digital parts of the base station transmitter of the invention comprise comparison means 313 for comparing the value of said counter means with a selected delay value contained in the programmable memory means 311, and for starting transmission of the information signals to be transmitted in said time-slot from the digital means, provided that the comparison provides the result that the selected delay value contained by said programmable memory means 311 is the same as the value of the above-mentioned counter means 310.

At least the following counters are required for forming a frame structure: the first one is a time-slot counter, the purpose of which is to count the sequence number of each current time-slot transmitted inside a TDMA frame, i.e. to count from zero to seven. This counter is updated each time when a counter counting the length of one time-slot restarts counting from the beginning.

A counter for counting the duration of one additional bit for time-slots 0 and 4 is also required (see FIG. 1). This counter is in operation when the counter indicating the length of the time-slot has finished, and the time-slot counter indicates it is a question of time-slot 0 or 4. This counter is also called an extra guard bit counter.

The operation of a base station of the invention is as follows. The rising edge of a signal FCK i.e. that of a frame alignment signal always resets all the counters. After the rising edge of the FCK, the counter 310 indicating the length of the time-slot restarts counting from zero. When the counter 310 indicating the length of the time-slot has finished, it is checked whether time-slot 0 or 4 is in question. If that is the case, the "extra guard bit" counter is started, and it is waited until it has finished counting.

When the above sequence has ended, the counter indicating the length 310 of the time-slot restarts counting from zero, while simultaneously the value indicated by the time-slot counter is increased.

When the frame alignment signal FCK arrives, counters start to count timing of the frames, which timing is also used for producing a power level signal. The last-mentioned counter may be used directly as an LSB part of a memory address. In such a case, a separate signal. is produced for indicating the start of each individual time-slot within a frame. This procedure controls producing the power level signal. From the signal indicating the start of the time-slot, another counter is triggered to count, and this counter will count up to a value corresponding to the combination of separate IQ_DELAY inputs, whereafter a start signal (Start-Times-lot) is transmitted to the modulator, whereby the modulator starts to send data of the time-slot in question to I and Q branches. Normally, modulated data is transmitted 4 bits after the beginning of a time-slot, but by means of IQ_DELAY inputs accurate timing may be adjusted in desired steps.

Figure 4:
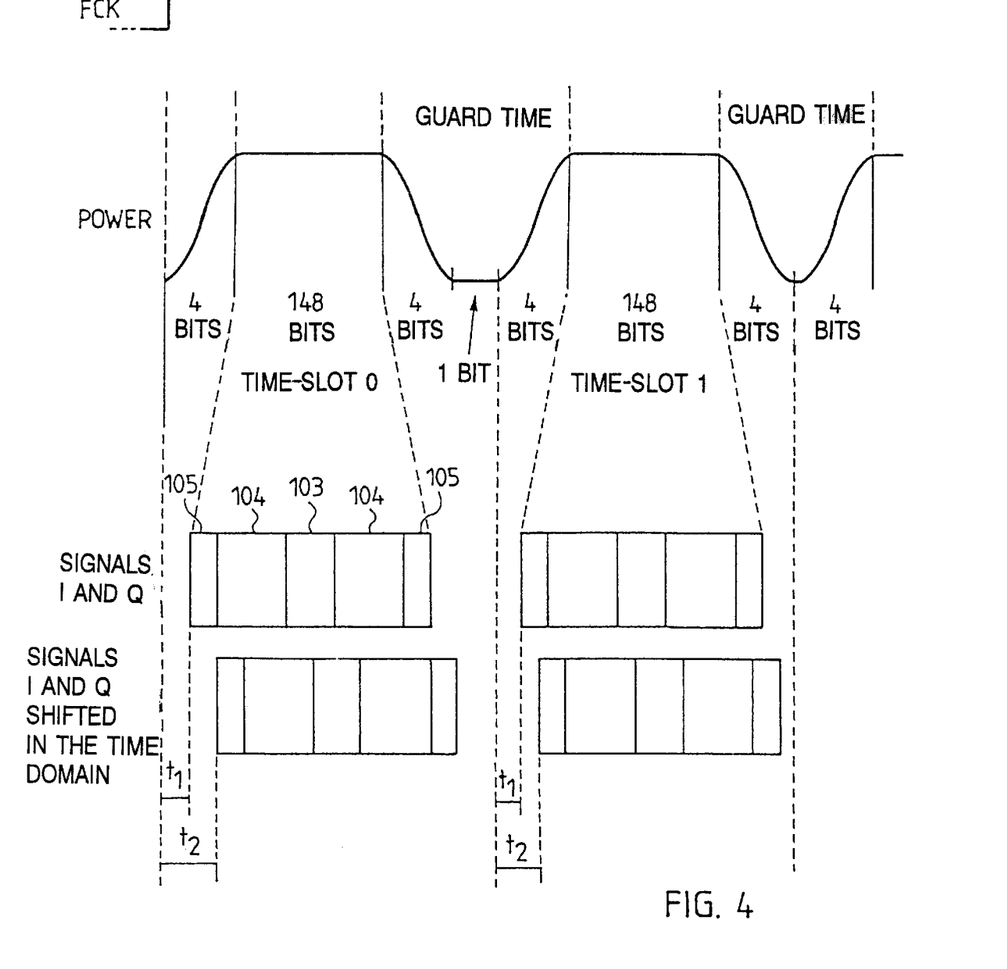
FIG. 4 shows mutual timing of modulated data and power control in a base station of the invention.

FIG. 4 shows mutual timing of modulated data (i.e. signals I and Q) and power control in a base station of the invention. Reference numbers 103, 104, and 105 shown in FIG. 4 correspond to those shown in FIG. 1. As the timing between signals I and Q and signal POWER is not known yet when the signals arrive at the amplifier, the timing between them is carried out by means of digital adjusting. It may thus be ensured that power control takes place at the right moment with respect to the data transmission to be modulated so that the amplification of the signals will be started at the right moment of time.

For this purpose, IQ_DELAY inputs are added to the digital parts. The basic idea is to delay the location of modulated data, i.e. of signals I and Q with respect to signal POWER. Since the timing of a time-slot is determined on the basis of the training sequence located in the modulated data, it is thus possible to adjust the power control so that it will occur within the range defined in GSM Recommendation 05.05.

In FIG. 4, the operation of the base station transmitter of the invention is also synchronized with the counter indicating the length of the time-slot. Each value of IQ_DELAY is represented by some value shown by the counter indicating the length of the time-slot. When the counter reaches this value, the I/Q modulator will be started, and transmission of the data to be modulated in the time-slot is started. FIG. 4 shows in accordance with the invention occurrence of signals I and Q transferred in the time domain with respect to the power amplification signal POWER. In FIG. 4, reference number t1 represents the time period which must pass in a case in accordance with the prior art from the frame alignment signal until the moment when signals I and Q arrive at the amplifier. Accordingly, reference number t2 in FIG. 4 illustrates a situation in which signals I and Q have been delayed so that they arrive at the amplifier after duration of time t2 after the frame alignment signal. It must be noted that t2 may also be a shorter time than t1.

Figure 5:
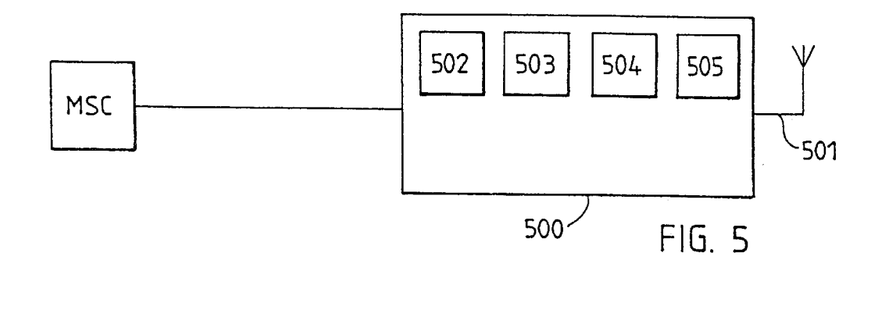
FIG. 5 shows a block diagram of a mobile communication system, its base station included.

FIG. 5 is a block diagram showing a mobile communication system and its base station. The figure shows a mobile switching centre MSC of a mobile communication system, e.g. of the GSM system, and a base station 500 of the mobile communication system connected to the MSC by data communication links. There may naturally be a base station controller between the mobile communication system and the base station, which base station controller forms a base station system together with a number of base stations. The base station 500 comprises an antenna 501 for transmitting radio signals divided into time-slots by means of a frame structure. The base station further comprises a controller unit 502 for controlling the base station, and means 503 for generating a frame alignment signal. The base station naturally comprises a transmitter 504 for generating a radio signal, and digital means 505 for producing a digital signal to be modulated.

The drawings and the explanation associated therewith are only intended to illustrate the idea of the present invention. The base station of the invention may vary in its details within the scope of the attached claims. Although the invention has been explained mostly in relation to the GSM mobile communication system, it may also be used in mobile communication systems of other types.

I claim:

1. A base station for a mobile communication system comprising one or more switching centers and base stations connected to it by telecommunication links, each base station comprising:

an antenna for transmitting radio signals divided into time-slots by means of a frame structure, each time-slot having a plurality of parts;

a controller unit for controlling the base station;

frame alignment means for producing a frame alignment signal;

a switch connected to the antenna;

a transmitter for generating a transmission signal, the transmitter being connected to the switch to supply the transmission signal to the antenna via the switch;

digital means for generating a digital signal to be modulated, the digital means comprising:

a counter means for counting the length of time-slots in a frame structure synchronized by said frame alignment signal, a programmable memory means, in which one or more delay values are each stored as a counter value, and selecting means for selecting from said one or more delay values a delay value desired by the user;

comparison means for comparing the value of said counter means with the selected delay value contained by the programmable memory means, and for starting transmission of information signals to be transmitted in said time-slot from the digital means, provided that the comparison provides the result that the selected delay value contained by said programmable memory means is the same as the value indicated by said counter means; and a power level memory responsive to said counter means and storing power level memory momentary power values corresponding to the parts of the time-slots in the frame structure, as well as information on whether the switch supplying the transmission signal of the transmitter to the antenna is switched off or on, or neither, said power level memory being arranged so that each part of the time-slot in a frame structure is represented by a specific memory address of the power level memory, and in the memory location corresponding to said memory address, in addition to momentary power values of the curve indicating the power level, information is stored on whether the switch supplying the transmission signal of the transmitter to the antenna is switched off or on, or neither.

2. A base station as claimed in claim 1, wherein said information on whether the switch supplying the transmission signal of the transmitter to the antenna is switched off or on, or neither is stored in form of two bit locations, one bit location adjusting the moment at which said switch is switched off, and the other one adjusting the moment at which said switch is switched on.

* * * * *